Dec. 14, 1965  W. NICLAS ETAL  3,223,566
METHOD OF MAKING PNEUMATIC TIRES FOR VEHICLES
Filed April 11, 1960
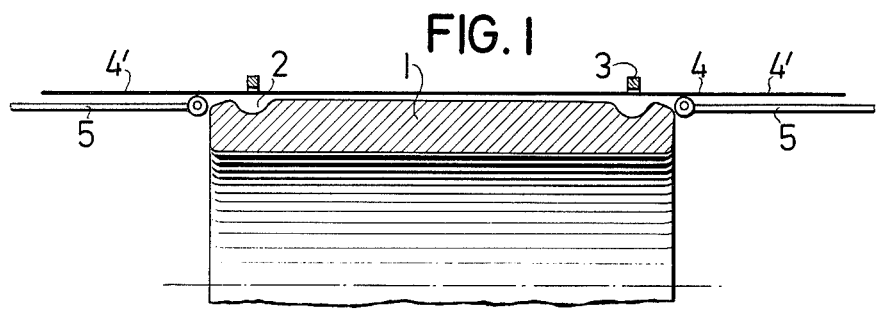
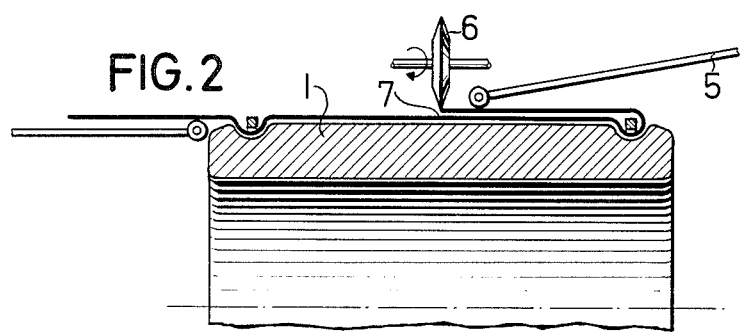
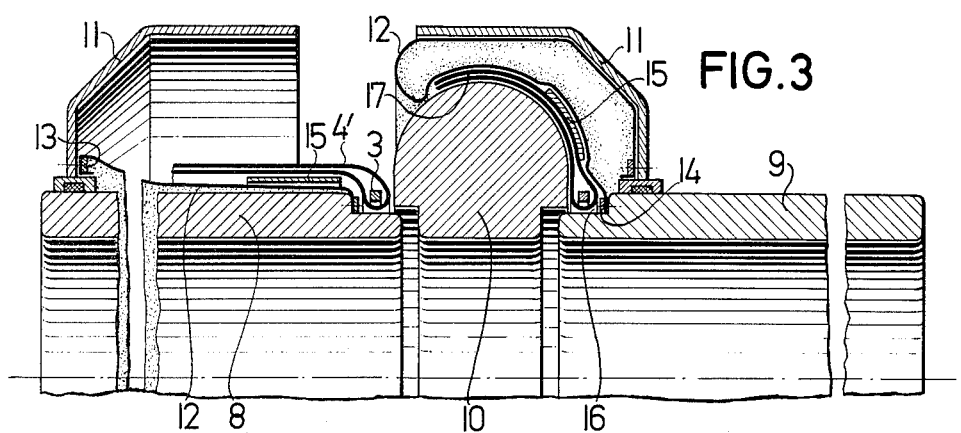
INVENTOR.
Walter NICLAS
BY Richard BECKADOLPH Dec. 14, 1965          W. NICLAS ETAL          3,223,566
           METHOD OF MAKING PNEUMATIC TIRES FOR VEHICLES
Filed April 11, 1960                              3 Sheets-Sheet 2
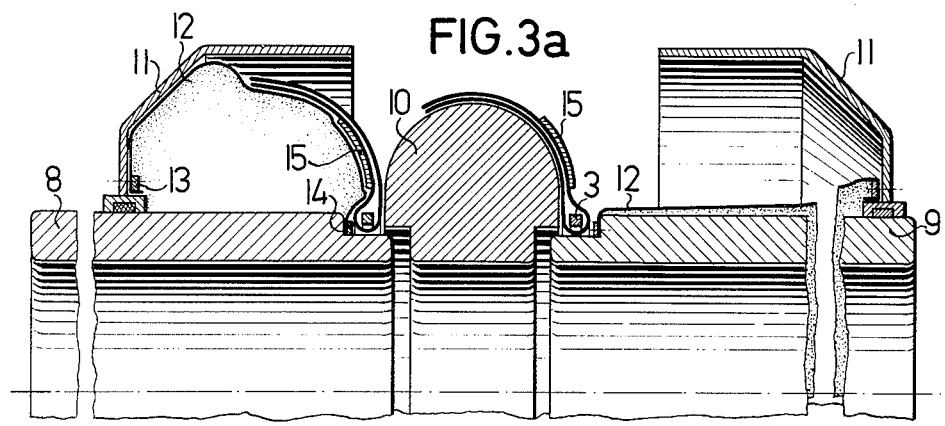
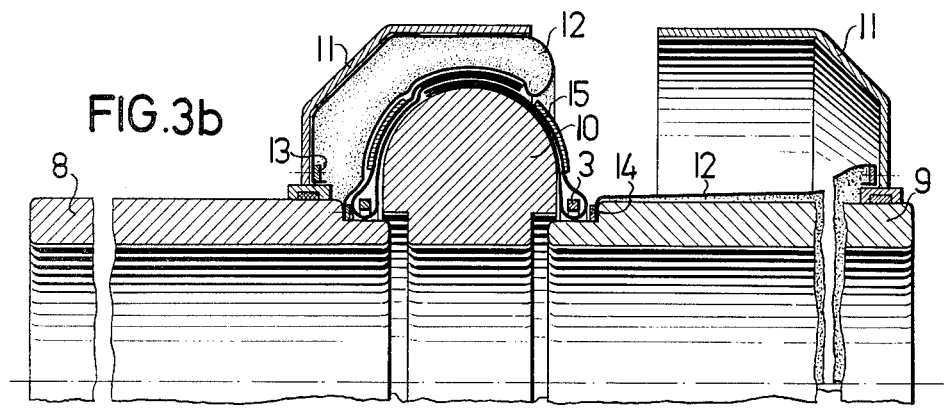
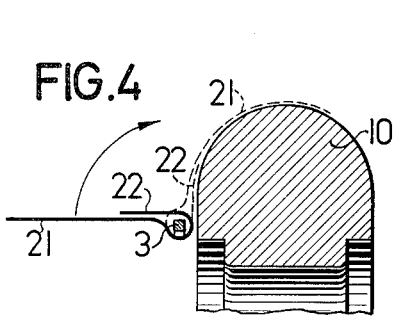
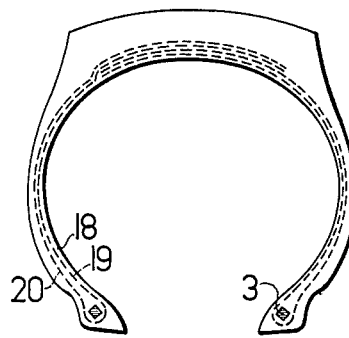
INVENTOR.
Walter NICLAS
BY Richard BECKADOLPH Dec. 14, 1965    W. NICLAS ETAL    3,223,566
METHOD OF MAKING PNEUMATIC TIRES FOR VEHICLES
Filed April 11, 1960    3 Sheets-Sheet 3
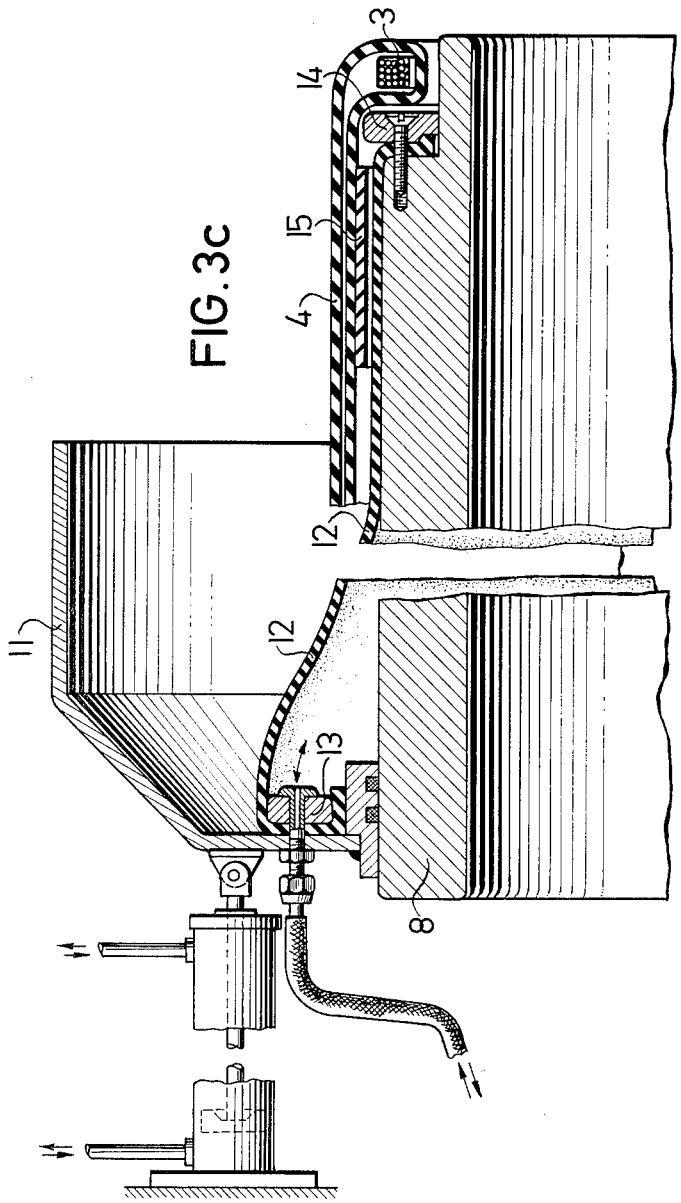
INVENTOR.
Walter NICLAS
Richard BECKADOLPH
BY 3,223,566
METHOD OF MAKING PNEUMATIC TIRES
FOR VEHICLES
Walter Niclas, Altwarmbuchen, and Richard Beckadolph, Hannover, Germany, assignors to Continental Gummi-Werke Aktiengesellschaft, Hannover, Germany
Filed Apr. 11, 1960, Ser. No. 21,284
Claims priority, application Germany, Apr. 13, 1959, C 18,785
2 Claims. (Cl. 156—123)

The present invention relates to a method of making pneumatic tires with reinforcing inserts for vehicles, said reinforcing inserts being anchored merely in one tire foot or heel.

It is an object of the present invention to provide an improved method of making pneumatic tires of the above mentioned type.

It is another object of this invention to provide a method of the above mentioned type which will make possible to provide two or more tire cores in each tire foot or heel.

These and other objects and advantages of the invention will appear more clearly from the following specification in connection with the accompanying drawing, in which:

FIGS. 1 and 2 illustrate a radial partial section through a device according to the invention for making partial carcasses while employing a tire building drum adapted to be enlarged in diameter, said two figures illustrating different phases of the manufacturing process.

FIG. 3 is a device for joining the tire carcass.

FIGS. 3a and 3b illustrate two different tire building phases of the left-hand machine portion (with regard to the drawing).

FIG. 3c shows on an enlarged scale the left-hand machine portion with the cylinder piston system for moving the cage and also illustrates the connection of the inflatable body to the cage and to a cylindrical supporting body.

FIG. 4 illustrates a special design of a tire carcass which for purposes of composing a raw tire is placed on an annular mandrel.

FIG. 5 is a partial section through a pneumatic tire made according to the present invention with the devices of FIGS. 1 and 3, said tire being already in vulcanized condition.

According to the present invention, hollow cylindrical partial carcasses or carcasses of substantial hollow cylindrical shape are produced. To this end, partial carcasses of the just mentioned shape are produced which comprise a reinforcing insert wound around a tire core and which are composed to a raw tire having at least approximately the cross section of the finished tire, in such a way that the reinforcing inserts which are on the outside of the partial carcass when the latter has its cylindrical shape as shown in FIG. 1 will, with the raw tire or finished tire, be located inside.

According to a further embodiment of the invention, it is possible to place the partial carcasses and the lateral rubber strips upon each other and to mold these parts together while forming the raw tire.

The method according to the present invention distinguishes from heretofore known methods by its simplicity because it is possible with simple technical means to produce the above mentioned partial carcass which consists primarily of a reinforcing insert wound around a tire core and which, with regard to the extension of the threads, bands, or the like, forming the reinforcing inserts, is so designed that pairs of partial carcasses supplementing each other can form a tire carcass.

The method according to the present invention furthermore furnishes the possibility to process partial carcasses of the same dimensions to tires of different sizes because the coherence of the carcass is effected by a connection of the partial carcasses which is brought about by an overlapping and the adhesive layer of rubber or the like arranged within the range of said overlapping between the chords of the carcass. This type of joining the carcasses even permits a certain compensation in length within the range of the overlap during the vulcanization, i.e. when the enveloping layers are still in plastic condition. Such compensation in length is not possible any longer with the finished vulcanized tire. Thus, the method according to the present invention furnishes a firm connection or joint of the partial carcasses with each other.

The method of the present invention is of particular importance with regard to the tensions and loads on those portions of the carcass or threads, bands, or the like, which are located in the neighborhood of the tire carcass. By transforming the partial carcass from its hollow cylindrical or its substantial hollow cylindrical shape into the shape corresponding to the finished tire or at least to a corresponding cross sectional shape so that the chords or bands which are located on the outside of the partial carcass will be located inside of the finished raw tire and later of the finished vulcanized tire, i.e. so as to face the hollow space of the tire, a uniform stress will be obtained of those sections of the threads, bands, or the like, which face the tire cores. Of these threads, bands or the like, neither the carcass portion facing the air space nor the outer carcass portions facing away from the air space will be extended to a major extent nor will they be overloaded in the finished tire. Inasmuch as with heretofore known methods of the type involved, a uniform stress of the mentioned carcass sections could not be obtained, it was necessary to produce heavier dimensioned carcasses or to employ relatively many carcass threads, bands or the like. The method according to the invention, however, assures a uniformity of the stress so that less heavily dimensioned carcasses will fully suffice.

Referring now to the method according to the invention in detail in conformity with the drawing, a fabric layer 4 is wound around a substantially cylindrical tire building drum 1 which at its end portions is provided with circular grooves 2 for receiving the pull-resistant tire cores 3 consisting of steel wires. The tire building drum 1 is of the general type which permits variation of the drum diameter. The fabric layer 4 is placed on the tire building drum 1 in such a way that the ends of said layer 4 protrude beyond the end portions of the drum 1. The arrangement shown in the drawing furthermore comprises members 5 arranged laterally of drum 1 and movable in axial direction of drum 1. These members 5 are shaped drum-like and likewise have a variable diameter. The members 5 may be of customary design.

The fabric layer 4 is placed on drum 1 when the latter is adjusted for its smallest diameter. The tire cores 3 which have a substantially non-variable diameter surround grooves 2 so that the cores 3, when enlarging the diameter of drum 1 in conformity with FIG. 2, will slip into said grooves 2 while pretensioning the fabric layer 4. Due to the expanding force of drum 1, the cores 3 will be firmly held on the drum. Thereupon, the members 5 are moved in a direction toward the central portion of drum 1 whereby the marginal portions 4' of the fabric layer 4 will be folded over cores 3 as shown in FIG. 2 so that the fabric layer 4 will be doubled. After the two fabric marginal portions 4' have been folded over the cores 3, the members 5 are returned to their starting positions shown in FIG. 1. Thereupon, a preferably rotatably cutting tool 6 is moved toward the central portion of the drum surface by means of which the fabric layer 4 is cut open at 7. In this way, two partial carcasses are obtained each of which comprises a tire core 3 and a doubled fabric layer 4 surrounding the respective tire core 3.

The thus obtained partial carcasses will then be further processed on a device according to FIG. 3, the structure of which may correspond substantially to the structure set forth in U.S. application Serial No. 714,877. Between the two cylindrical supporting members 8 and 9 there is arranged an annular core 10 the outer contour of which corresponds substantially to the inner contour of the finished vulcanized tire. This core 10 serves for building up the carcass. Axially displaceably mounted on supporting members 8 and 9 is a cage 11 to the foot of which at 13 (FIG. 3c) there is connected an annular inflatable body 12 preferably of rubber material or the like. That end of the inflatable body 12 which faces core 10 is held fast at 14 to the front ends of the supporting bodies 8 and 9 for instance by means of screws.

When cage 11 is spaced relatively far from core 10, the inflatable body 12 practically rests on the supporting bodies 8 and 9 and thus has a substantially cylindrical outer surface. Upon this outer surface is then placed first the lateral rubber strip 15 and then the partial carcass made according to FIGS. 1 and 2 with core 3 and fabric layer 4. Preferably, tire core 3 is placed on a step 16 (FIG. 3). The partial carcass and the lateral rubber strip 15 are expediently mounted when the preferably axially movable supporting bodies 8 and 9 are still sufficiently far spaced from core 10.

After the supporting bodies 8 and 9 have been moved toward the core 10 so that the position according to the left side of FIG. 3 has been reached, a pressure fluid, preferably air under pressure, is introduced into the space between the inflatable body 12 and the supporting bodies 8 and 9. When inflating body 12, the outer surface of inflatable body 12 will be enlarged, while the lateral rubber strip 15 and the partial carcass will be partially lifted and deformed. With this deformation and with increasing inflation of the inflatable body 12, the cage 11 is moved toward core 10. During this operation, the partial carcass and the fabric layer 4 will engage core 10. When cage 11 has reached its end position (see FIG. 3 right-hand side), the partial carcass has been deformed and engages core 10.

After one partial carcass engages core 10, the other partial carcass is likewise by inflating the inflatable body 12 and by moving cage 11 in the direction toward core 10 brought into engagement with core 10 as shown in FIGS. 3a and 3b. In this way, a tire carcass will be obtained. The ends of the tire carcasses overlap at 17 within the range of the maximum circumferential extension of core 10.

The thus composed carcass may then be completed by placing thereupon further parts, such as the tread and the lateral rubber strip 15 if the latter has not yet been mounted by means of the device of FIG. 3.

This raw tire will then be vulcanized in a manner known per se, and a cross sectional shape will be obtained as it is illustrated in FIG. 5.

The deformation of the partial carcass as it will be carried out by means of the device of FIG. 3 will assure that the threads, bands, or the like, which form the fabric layer 4, and are located in the neighborhood of the tire carcass 3, i.e. within the range 18 of the finished vulcanized tire, will be subjected to uniform stress. In other words, neither the threads 19 on the inside nor threads 20 (FIG. 5) on the outside will be excessively extended. The threads 19 and 20 will substantially uniformly be stressed or loaded.

In conformity with the invention, it is not necessary that under all circumstances the partial carcass is doubled over the entire range of its width. Instead, it is also possible to employ a partial carcass of practically one layer 21 only which partial carcass will then have one end thereof just looped around the tire core 3. The processing of such a partial carcass may likewise be effected by means of the device according to FIG. 3 in which instance the layer 21 engages core 10. The short end piece 22 looped around core 3 will then be located between layer 21 and core 10. This way of anchoring layer 21 on core 3, i.e. the arrangement of the end piece 22 on the inner surface of the carcass, is particularly advantageous because the free end piece 22 will then be unable harmfully to affect the tire body.

According to the method of the present invention, also two or more tire cores 3 may be employed in each tire heel. This can be effected by employing a corresponding number of partial carcasses.

It is furthermore possible to provide additional annular reinforcing layers between the ends of the partial carcass within the range of the overlapping 17. Such additional annular reinforcing layers may be arranged above and below the overlapping portion 17.

It is also possible instead of the arrangement of FIGS. 1 and 2 to employ a device by means of which a partial carcass only will be formed while the fabric, however, will in the form of a hose and continuously be moved to the device. The fabric will then be correspondingly folded.

It is, of course, to be understood that the present invention is, by no means, limited to the specific method described in conformity with the drawing but also comprises any modifications within the scope of the appended claims.

What we claim is:

1. A method of making substantially identical pneumatic tire carcass sections for making pneumatic vehicle tires therefrom, which includes the steps of: applying fabric plies to an expandable drum having spaced grooves therein to form a cylindrical fabric body on the drum having end portions extending beyond said grooves at both ends of the drum, placing bead cores upon the fabric body in alignment with said grooves, expanding the drum to cause the bead cores to be moved into said grooves, folding the end portions of said fabric body axially inwardly over the respective adjacent bead core, and cutting said fabric body midway between the two bead cores to form two cylindrical sections.

2. In a method of making pneumatic vehicle tires having reinforcing inserts anchored in the tire beads, the steps of: applying fabric plies to an expansible cylindrical drum having spaced grooves therein to form a cylindrical fabric layer thereon, placing annular bead cores upon the fabric plies in radial alignment with the grooves, expanding the drum to cause the bead cores to move into said grooves, folding the outer end portions of said cylindrical fabric layer over the respective adjacent bead core, cutting the fabric midway between the two bead cores to form two cylindrical sections, collapsing the said drum and removing the said sections therefrom, and placing said sections in spaced coaxial relation with the bead core edges thereof on the inside, and forming the fabric plies radially outwardly and axially toward each other to at least the approximate shape which the finished tire to be built will have, while supporting said bead cores in such spaced relation that the fabric plies when formed in the aforesaid manner will overlap in the zenith portion of the tire.

References Cited by the Examiner
UNITED STATES PATENTS

| | | | |
|---|---|---|---|
| 1,529,843 | 3/1925 | Midgley | 156—493 |
| 1,585,900 | 5/1926 | Desautels | 156—136 X |
| 1,732,793 | 3/1929 | Darrow | 156—182 |
| 1,944,768 | 1/1934 | Stevens | 156—136 |
| 2,703,132 | 3/1955 | Darrow | 156—123 |
| 2,743,760 | 5/1956 | Beckadolph | 156—132 |
| 3,011,540 | 12/1961 | Vanzo | 156—136 X |

OTHER REFERENCES

Burton, Walter E.: The Story of Tire Beads, New York, McGraw-Hill, 1954 pp. 97–101.

EARL M. BERGERT, *Primary Examiner.*

CARL F. KRAFFT, ALEXANDER WYMAN, JOSEPH REBOLD, *Examiners.*